United States Patent
Shimizu

(10) Patent No.: US 10,800,401 B2
(45) Date of Patent: Oct. 13, 2020

(54) HYBRID VEHICLE

(71) Applicant: TOYOTA JIDOSHA KABUSHIKI KAISHA, Toyota-shi, Aichi-ken (JP)

(72) Inventor: Yu Shimizu, Toyota (JP)

(73) Assignee: TOYOTA JIDOSHA KABUSHIKI KAISHA, Toyota-shi, Aichi-ken (JP)

(*) Notice: Subject to any disclaimer, the term of this patent is extended or adjusted under 35 U.S.C. 154(b) by 243 days.

(21) Appl. No.: 16/117,217

(22) Filed: Aug. 30, 2018

(65) Prior Publication Data

US 2019/0111913 A1    Apr. 18, 2019

(30) Foreign Application Priority Data

Oct. 13, 2017    (JP) .................. 2017-199255

(51) Int. Cl.

| | |
|---|---|
| *B60W 20/30* | (2016.01) |
| *B60K 6/365* | (2007.10) |
| *B60K 6/26* | (2007.10) |
| *B60K 6/40* | (2007.10) |
| *H02M 7/5387* | (2007.01) |
| *H02P 5/74* | (2006.01) |
| *B60W 50/06* | (2006.01) |
| *H02P 5/69* | (2006.01) |
| *B60K 6/445* | (2007.10) |
| *B60W 10/06* | (2006.01) |
| *B60W 20/15* | (2016.01) |
| *B60W 10/08* | (2006.01) |
| *H02M 3/158* | (2006.01) |

(52) U.S. Cl.
CPC ............ *B60W 20/30* (2013.01); *B60K 6/26* (2013.01); *B60K 6/365* (2013.01); *B60K 6/40* (2013.01); *B60K 6/445* (2013.01); *B60W 10/06* (2013.01); *B60W 10/08* (2013.01); *B60W 20/15* (2016.01); *B60W 50/06* (2013.01); *H02M 7/5387* (2013.01); *H02P 5/69* (2013.01); *H02P 5/74* (2013.01); *B60W 2510/1005* (2013.01); *B60W 2540/16* (2013.01); *B60W 2710/08* (2013.01); *B60Y 2200/92* (2013.01); *H02M 3/1582* (2013.01); *H02P 2201/07* (2013.01)

(58) Field of Classification Search
CPC ...... B60W 20/30; B60W 20/15; B60W 10/08; B60K 6/445
See application file for complete search history.

(56) References Cited

U.S. PATENT DOCUMENTS 7,099,756 B2 * 8/2006 Sato ................... B60L 50/16
                                                   701/22
8,083,015 B2 * 12/2011 Kobayashi ........... B60W 20/10
                                                   180/65.21

(Continued)

FOREIGN PATENT DOCUMENTS

| JP | 2017-056774 A | 3/2017 |
|---|---|---|
| JP | 2017-065604 A | 4/2017 |
| JP | 2017-114209 A | 6/2017 |

*Primary Examiner* — Katy M Ebner
(74) *Attorney, Agent, or Firm* — Sughrue Mion, PLLC

(57) ABSTRACT

When a shift position is changed from a non-forward operating position to a forward operating position during a predetermined operation that shuts off gates of a first inverter and a second inverter and operates an engine, a step-up/down converter is controlled to gradually change the voltage of a high voltage-side power line toward a required voltage that is lower than a reverse voltage of a first motor.

6 Claims, 5 Drawing Sheets

(56) References Cited

U.S. PATENT DOCUMENTS

| | | | | |
|---|---|---|---|---|
| 8,098,032 B2 * | 1/2012 | Yamada | ............ | H02M 7/53871 |
| | | | | 318/400.01 |
| 8,297,391 B2 * | 10/2012 | Oyobe | .................... | B60K 6/26 |
| | | | | 180/65.275 |
| 8,423,232 B2 * | 4/2013 | Tsutsumi | ............... | B60K 6/445 |
| | | | | 477/34 |
| 8,565,953 B2 * | 10/2013 | Kato | .................... | B60W 10/06 |
| | | | | 701/22 |
| 9,102,324 B2 * | 8/2015 | Kim | ...................... | B60W 20/30 |
| 9,174,525 B2 * | 11/2015 | Caron | ..................... | H02P 25/08 |
| 10,166,870 B2 * | 1/2019 | Shimizu | .................. | B60L 3/04 |
| 10,195,959 B2 * | 2/2019 | Nozawa | ............... | B60L 3/0046 |
| 10,214,200 B2 * | 2/2019 | Shimizu | ................. | B60L 50/61 |
| 10,239,406 B2 * | 3/2019 | Shimizu | .......... | B60W 30/18127 |
| 10,259,446 B1 * | 4/2019 | Shimizu | ................. | B60L 50/61 |
| 10,293,807 B2 * | 5/2019 | Bae | ....................... | B60W 20/30 |
| 10,549,746 B2 * | 2/2020 | Ito | .......................... | B60K 6/445 |
| 10,611,365 B2 * | 4/2020 | Shimizu | ............. | B60W 30/182 |
| 2019/0052167 A1 * | 2/2019 | Escudero Rodriguez | ................... | |
| | | | | H02M 3/33584 |

* cited by examiner

HYBRID VEHICLE

CROSS-REFERENCE TO RELATED APPLICATION

This application claims priority to Japanese Patent Application No. 2017-199255 filed on Oct. 13, 2017, the contents of which is incorporated herein by reference.

TECHNICAL FIELD

The present disclosure relates to a hybrid vehicle or more specifically to a hybrid vehicle including an engine, a planetary gear, two motors, two inverters, a power storage device and a step-up/down converter.

BACKGROUND

A proposed configuration of a hybrid vehicle includes an engine; a first motor configured to generate a reverse voltage by rotation; a planetary gear configured to include a sun gear, a carrier and a ring gear respectively connected with the first motor, the engine and an output shaft coupled with drive wheels; a second motor connected with the output shaft; a first inverter configured to drive the first motor; a second inverter configured to drive the second motor; a battery; and a converter connected with a first power line, which the battery is connected with, and with a second power line, which the first inverter and the second inverter are connected with, and configured to transmit electric power between the first power line and the second power line with regulation of a voltage of the second power line (as described in, for example, JP 2017-65604A). During a run of the hybrid vehicle with shutting off gates of the first inverter and the second inverter and operating the engine, the hybrid vehicle of this configuration controls the engine and the converter such that the voltage of the second power line is lower than the reverse voltage of the first motor. This causes the first motor to generate a reverse torque, and outputs a drive torque as a reactive force of this reverse torque to the output shaft to enable the hybrid vehicle to run forward.

CITATION LIST

Patent Literature

PTL 1: JP2017-065604A

SUMMARY

When the shift position is changed to a non-forward operating position during the above run, the hybrid vehicle of this configuration stops driving the converter. This makes the reverse voltage of the first motor equal to the voltage of the second power line. When the shift position is subsequently changed from the non-forward operating position to a forward operating position, control of abruptly decreasing the voltage of the second power line to a required voltage that is lower than the reverse voltage of the first motor may cause the following phenomenon, due to the lower response of the engine (more specifically, the lower change response of the torque of the engine) than the response of the step-up/down converter (more specifically, the change response of the voltage of the second power line). The phenomenon sharply increases a voltage difference between the reverse voltage of the first motor and the voltage of the second power line and thereby sharply increases the reverse torque of the first motor. The sharp increase of the reverse torque of the first motor reduces the rotation speed of the first motor, decreases the voltage difference, and thereby decreases the reverse torque of the first motor. A subsequent increase in the torque of the engine results in increasing the rotation speed of the first motor, increasing the voltage difference and thereby increasing the reverse torque of the first motor. This phenomenon causes the drive torque output to the output shaft as the reactive force of the reverse torque of the first motor to become unstable.

A hybrid vehicle of the present disclosure mainly aims to suppress a torque output to a driveshaft that is coupled with drive wheels from becoming unstable when a shift position is changed from a non-forward operating position to a forward operating position during an operation that shuts off gates of a first inverter and a second inverter and operates an engine.

SOLUTION TO PROBLEM

In order to achieve the above primary object, the hybrid vehicle of the disclosure is implemented by an aspect described below.

The present disclosure is directed to a hybrid vehicle. The hybrid vehicle includes an engine, a first motor configured to generate a reverse voltage by rotation, a planetary gear configured to include three rotational elements respectively connected with three axes of the first motor, the engine, and a driveshaft coupled with drive wheels, such that the first motor, the engine and the driveshaft are aligned in this sequence in an alignment chart, a second motor configured to input and output power into and from the driveshaft, a first inverter configured to drive the first motor, a second inverter configured to drive the second motor, a power storage device, a step-up/down converter connected with a low voltage-side power line, which the power storage device is connected with, and with a high voltage-side power line, which the first inverter and the second inverter are connected with, and configured to transmit electric power between the low voltage-side power line and the high voltage-side power line with regulation of a voltage of the high voltage-side power line, and a control device configured to control the step-up/down converter such that the voltage of the high voltage-side power line is lower than a reverse voltage of the first motor when a shift position is a forward operating position, and to stop driving the step-up/down converter when the shift position is a non-forward operating position, during a predetermined operation that shuts off gates of the first inverter and the second inverter and operates the engine. When the shift position is changed from the non-forward operating position to the forward operating position during the predetermined operation, the control device controls the step-up/down converter to gradually change the voltage of the high voltage-side power line toward a required voltage that is lower than the reverse voltage of the first motor.

During the predetermined operation that shuts off the gates of the first inverter and the second inverter and operates the engine, when the shift position is the forward operating position, the hybrid vehicle of this aspect controls the step-up/down converter, such that the voltage of the high voltage-side power line is lower than the reverse voltage of the first motor. When the shift position is the non-forward operating position, the hybrid vehicle of this aspect stops driving the step-up/down converter. When the shift position is the forward operating position, the lower voltage of the high voltage-side power line than the reverse voltage of the first motor causes the first motor to generate a regenerative torque (reverse torque) corresponding to a voltage difference between the reverse voltage of the first motor and the voltage of the high voltage-side power line, and enables a reactive torque of this regenerative torque to be output to the driveshaft as a drive torque (forward torque) and thereby cause the hybrid vehicle to run forward. When the shift position is changed from the non-forward operating position to the forward operating position during the predetermined operation, the hybrid vehicle of this aspect controls the step-up/down converter to gradually change the voltage of the high voltage-side power line toward the required voltage that is lower than the reverse voltage of the first motor. This suppresses a sharp increase in the voltage difference between the reverse voltage of the first motor and the voltage of the high voltage-side power line and suppresses a sharp increase in the regenerative torque (reverse torque) of the first motor and thereby a sharp increase in the drive torque of the driveshaft. Suppressing the sharp increase in the regenerative torque of the first motor suppresses a reduction in the rotation speed of the first motor and thereby a decrease in the voltage difference due to the lower response of the engine than the response of the step-up/down converter, and suppresses a decrease in the regenerative torque of the first motor and thereby a decrease in the drive torque of the driveshaft. As a result, this configuration suppresses the drive torque of the driveshaft from becoming unstable.

DESCRIPTION OF EMBODIMENTS

The following describes aspects of the present disclosure with reference to some embodiments.

Figure 1:
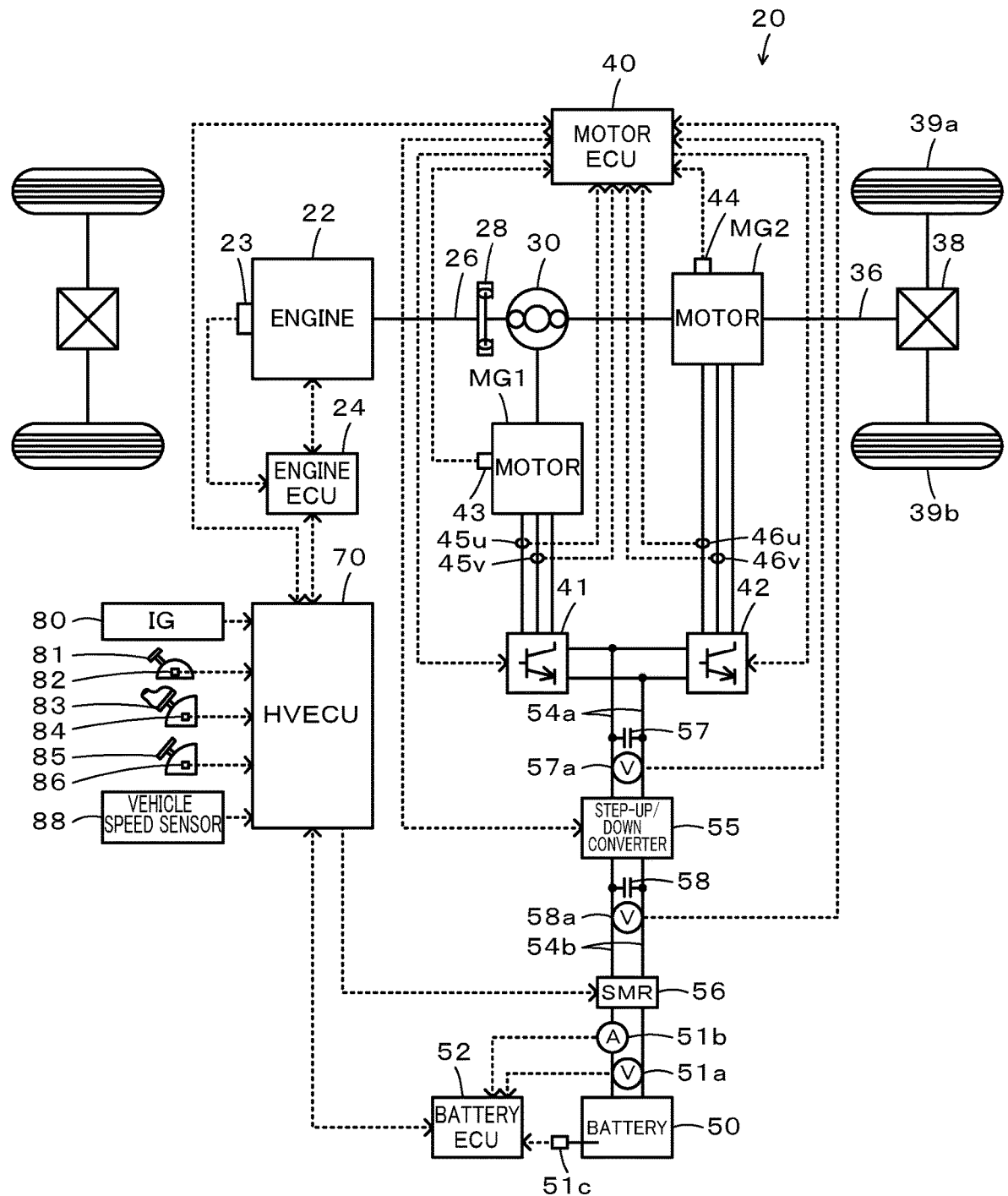
FIG. 1 is a configuration diagram illustrating the schematic configuration of a hybrid vehicle 20 according to one embodiment of the present disclosure.
Figure 2:
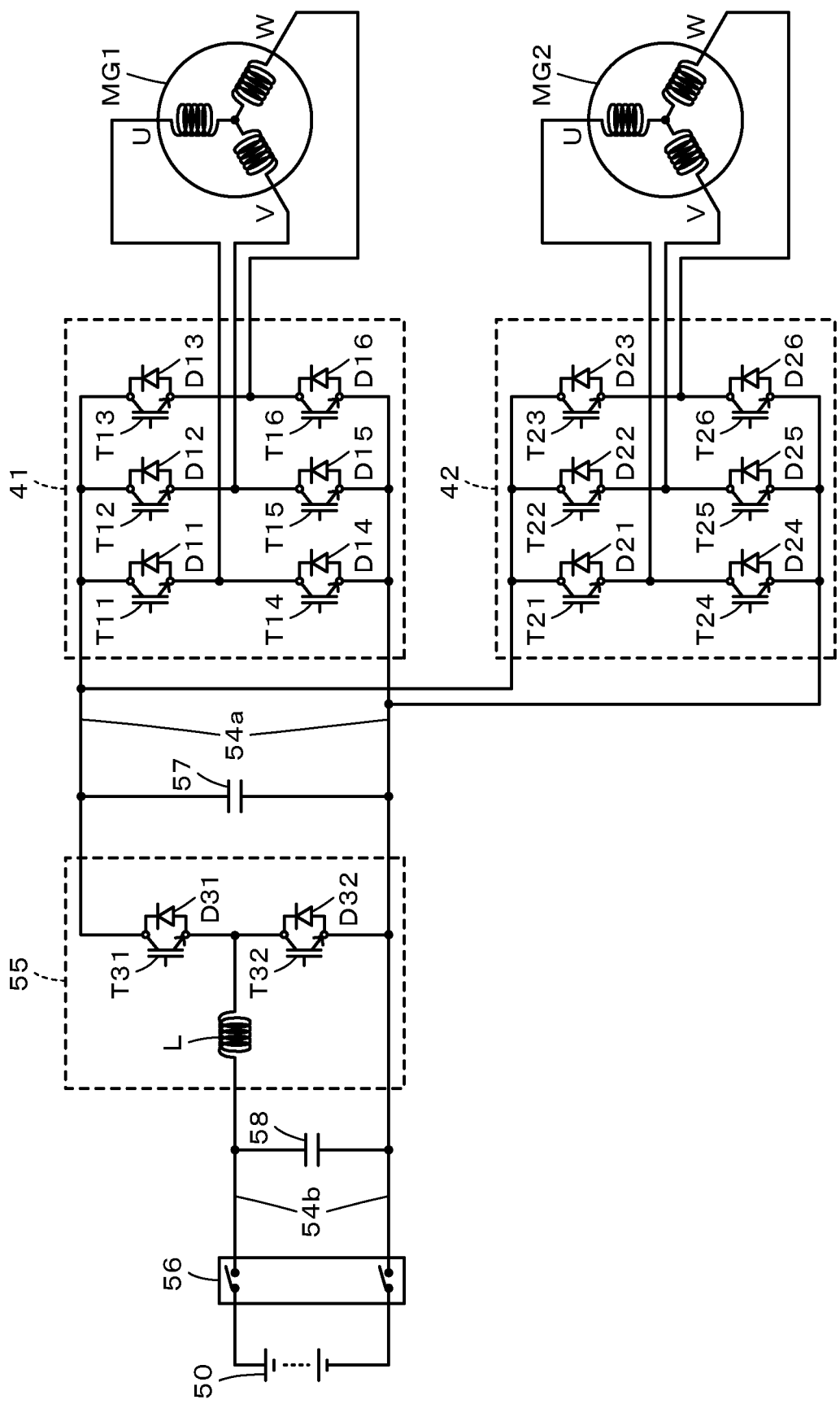
FIG. 2 is a configuration diagram illustrating the schematic configuration of an electric drive system including motors MG1 and MG2.

FIG. 1 is a configuration diagram illustrating the schematic configuration of a hybrid vehicle 20 according to one embodiment of the present disclosure. FIG. 2 is a configuration diagram illustrating the schematic configuration of an electric drive system including motors MG1 and MG2. As illustrated, the hybrid vehicle 20 of the embodiment includes an engine 22, a planetary gear 30, motors MG1 and MG2, inverters 41 and 42, a step-up/down converter 55, a battery 50 as a power storage device, a system main relay 56, and a hybrid electronic control unit (hereinafter referred to as "HVECU") 70.

The engine 22 is configured as an internal combustion engine to output power using, for example, gasoline or light oil as a fuel and is connected with a carrier of the planetary gear 30 via a damper 28. The engine 22 is operated and controlled by an engine electronic control unit (hereinafter referred to as "engine ECU") 24.

The engine ECU 24 is configured as a CPU-based microprocessor and includes a ROM configured to store processing programs, a RAM configured to temporarily store data, input/output ports and a communication port, in addition to the CPU, although not being illustrated. Signals from various sensors required for operation control of the engine 22, for example, a crank angle θcr from a crank position sensor 23 configured to detect the rotational position of a crankshaft 26 of the engine 22, are input into the engine ECU 24 via the input port. Various control signals for operation control of the engine 22 are output from the engine ECU 24 via the output port. The engine ECU 24 is connected with the HVECU 70 via the respective communication ports. The engine ECU 24 calculates a rotation speed Ne of the engine 22, based on the crank angle θcr from the crank position sensor 23.

The planetary gear 30 is configured as a single pinion-type planetary gear mechanism. The planetary gear 30 includes a sun gear that is connected with a rotor of the motor MG1. The planetary gear 30 also includes a ring gear that is connected with a driveshaft 36 which is coupled with drive wheels 39a and 39b via a differential gear 38. The planetary gear 30 further includes a carrier that is connected with the crankshaft 26 of the engine 22 via the damper 28 as described above.

The motor MG1 is configured as asynchronous generator motor including a rotor with permanent magnets embedded therein and a stator with three-phase coils wound thereon. The rotor of this motor MG1 is connected with the sun gear of the planetary gear 30 as described above. The motor MG2 is also configured as a synchronous generator motor like the motor MG1. A rotor of this motor MG2 is connected with the driveshaft 36.

The inverters 41 and 42 are used to drive the motors MG1 and MG2. As shown in FIG. 2, the inverter 41 is connected with high voltage-side power lines 54a and includes six transistors T11 to T16 serving as six switching elements and six diodes D11 to D16 that are respectively connected in parallel to the six transistors T11 to T16. The transistors T11 to T16 are arranged in pairs, such that two transistors in each pair respectively serve as a source and a sink relative to a positive electrode line and a negative electrode line of the high voltage-side power lines 54a. The respective phases of the three-phase coils (U phase, V phase and W phase) of the motor MG1 are connected with connection points of the respective pairs of the transistors T11 to T16. Accordingly, when a voltage is applied to the inverter 41, a motor electronic control unit (hereinafter referred to as "motor ECU") 40 regulates the rates of ON times of the respective pairs of the transistors T11 to T16 to provide a rotating magnetic field in the three-phase coils and thereby rotate and drive the motor MG1. Like the inverter 41, the inverter 42 is also connected with the high voltage-side power lines 54a and includes six transistors 121 to 126 and six diodes D21 to D26. When a voltage is applied to the inverter 42, the motor ECU 40 regulates the rates of ON times of the respective pairs of the transistors T21 to T26 to provide a rotating magnetic field in the three-phase coils and thereby rotate and drive the motor MG2.

The step-up/down converter 55 is connected with the high voltage-side power lines 54a and with low voltage-side power lines 54b and includes two transistors T31 and T32 serving as two switching elements, two diodes D31 and D32 respectively connected in parallel to the two transistors T31 and T32, and a reactor L. The transistor T31 is connected with the positive electrode line of the high voltage-side power lines 54a. The transistor T32 is connected with the transistor T31 and with negative electrode lines of the high voltage-side power lines 54a and of the low voltage-side power lines 54b. The reactor L is connected with a connection point between the transistors T31 and T32 and with a positive electrode line of the low voltage-side power lines 54b. The motor ECU 40 regulates the rates of ON times of the transistors T31 and T32, such that the step-up/down converter 55 steps up an electric power of the low voltage-side power lines 54b and supplies the stepped-up electric power to the high voltage-side power lines 54a, while stepping down an electric power of the high voltage-side power lines 54a and supplying the stepped-down electric power to the low voltage-side power lines 54b, accompanied with regulation of a voltage VH of the high voltage-side power lines 54a. A capacitor 57 for smoothing is mounted to the positive electrode line and the negative electrode line of the high voltage-side power lines 54a. A capacitor 58 for smoothing is mounted to the positive electrode line and the negative electrode line of the low voltage-side power lines 54b.

The motor ECU 40 is configured as a CPU-based microprocessor and includes a ROM configured to store processing programs, a RAM configured to temporarily store data, input/output ports, and a communication port, in addition to the CPU, although not being illustrated. As shown in FIG. 1, signals from various sensors required for drive control of the motors MG1 and MG2 and the step-up/down converter 55 are input into the motor ECU 40 via the input port. The signals input into the motor ECU 40 include, for example, rotational positions θm1 and θm2 from rotational position detection sensors 43 and 44 configured to detect the rotational positions of the respective rotors of the motors MG1 and MG2 and phase currents Iu1, Iv1, Iu2 and Iv2 from current sensors 45u, 45v, 46u and 46v configured to detect electric currents flowing in the respective phases of the motors MG1 and MG2. The input signals also include a voltage (high voltage-side voltage) VH of the capacitor 57 (high voltage-side power lines 54a) from a voltage sensor 57a mounted between terminals of the capacitor 57 and a voltage (low voltage-side voltage) VL of the capacitor 58 (low voltage-side power lines 54b) from a voltage sensor 58a mounted between terminals of the capacitor 58. Various control signals for drive control of the motors MG1 and MG2 and the step-up/down converter 55 are output from the motor ECU 40 via the output port. The signals output from the motor ECU 40 include, for example, switching control signals to the transistors T11 to T16 of the inverter 41 and the transistors T21 to T26 of the inverter 42 and switching control signals to the transistors T31 and T32 of the step-up/down converter 55. The motor ECU 40 is connected with the HVECU 70 via the respective communication ports. The motor ECU 40 calculates electrical angles θe1 and θe2, angular velocities ωm1 and ωm2 and rotation speeds Nm1 and Nm2 of the respective motors MG1 and MG2, based on the rotational positions θm1 and θm2 of the respective rotors of the motors MG1 and MG2 input from the rotational position detection sensors 43 and 44.

The battery 50 is configured as, for example, a lithium ion rechargeable battery or a nickel metal hydride battery having a rated voltage of, for example, 200 V and is connected with the low voltage-side power lines 54b. This battery 50 is under management of a battery electronic control unit (hereinafter referred to as "battery ECU") 52.

The battery ECU 52 is configured as a CPU-based microprocessor and includes a ROM configured to store processing programs, a RAM configured to temporarily store data input/output ports, and a communication port, in addition to the CPU, although not being illustrated. Signals from various sensors required for management of the battery 50 are input into the battery ECU 52 via the input port. The signals input into the battery ECU 52 include, for example, a voltage Vb of the battery 50 from a voltage sensor 51a placed between terminals of the battery 50, an electric current Ib of the battery 50 from a current sensor 51b mounted to an output terminal of the battery 50, and a temperature Tb of the battery 50 from a temperature sensor 51c mounted to the battery 50. The battery ECU 52 is connected with the HVECU 70 via the respective communication ports. The battery ECU 52 calculates a state of charge SOC, based on an integrated value of the electric current Ib of the battery 50 input from the current sensor 51b. The state of charge SOC denotes a ratio of the capacity of electric power dischargeable from the battery 50 to the overall capacity of the battery 50.

The system main relay 56 is provided on the battery 50-side of the capacitor 58 in the low voltage-side power lines 54b. This system main relay 56 is controlled on and off by the HVECU 70 to connect and disconnect the battery 50 with and from the step-up/down converter 55-side.

The HVECU 70 is configured as a CPU-based microprocessor and includes a ROM configured to store processing programs, a RAM configured to temporarily store data, input/output ports and a communication port, in addition to the CPU, although not being illustrated. Signals from various sensors are input into the HVECU 70 via the input port. The signals input into the HVECU 70 include, for example, an ignition signal from an ignition switch 80 and a shift position SP from a shift position sensor 82 configured to detect an operating position of a shift lever 81. The input signals also include an accelerator position Acc from an accelerator pedal position sensor 84 configured to detect a depression amount of an accelerator pedal 83, a brake pedal position BP from a brake pedal position sensor 86 configured to detect a depression amount of a brake pedal 85, and a vehicle speed V from a vehicle speed sensor 88. Examples of the shift position SP include a parking position (P position), a reverse position (R position), a neutral position (N position), a drive position (D position) and a brake position (B position). The B position provides an equivalent driving force in an accelerator-on state to the driving force at the D position and a greater driving force in an accelerator-off state than the driving force at the D position. The HVECU 70 is connected with the engine ECU 24, the motor ECU 40 and the battery ECU 52 via the respective communication ports as described above.

The hybrid vehicle 20 of the embodiment having the above configuration sets a required driving force of the driveshaft 36 based on the accelerator position Acc and the vehicle speed V and controls the operations of the engine 22 and the motors MG1 and MG2 such that a required power meeting the required driving force is output to the driveshaft 36. The hybrid vehicle 20 of the embodiment may employ, for example, the following three modes (1) to (3) as operation modes of the engine 22 and the motors MG1 and MG2:

(1) torque conversion operation mode that denotes a mode of operating and controlling the engine 22 such that a power corresponding to the required power is output from the engine 22, and of driving and controlling the motors MG1 and MG2 such that the whole of the power output from the engine 22 is subjected to torque conversion by the planetary gear 30 and the motors MG1 and MG2 and that the required power is output to the driveshaft 36;

(2) charge-discharge operation mode that denotes a mode of operating and controlling the engine 22 such that a power corresponding to the sum of the required power and an electric power required for charging or discharging the battery 50 is output from the engine 22, and of driving and controlling the motors MG1 and MG2 such that the whole or part of the power output from the engine 22 is subjected to torque conversion by the planetary gear 30 and the motors MG1 and MG2 accompanied with charging or discharging of the battery 50 and that the required power is output to the driveshaft 36; and (3) motor operation mode that denotes a mode of stopping operation of the engine 22 and of driving and controlling the motor MG2 such that the required power is output to the driveshaft 36.

In the event of an abnormality occurring in any of the inverters 41 and 42 and the sensors used to control the inverters 41 and 42 (for example, the current sensors 45u, 45v, 46u and 46v) during operation of the engine 22, the hybrid vehicle 20 of the embodiment shuts off the gates of the inverters 41 and 42 (i.e., sets off all the transistors T11 to T16 and T21 to T26), while continuing operation of the engine 22. In the description below, this state is called "inverter-less operation".

At the shift position SP set to a forward operating position (D position or B position) during the inverter-less operation, the HVECU 70 sets a required rotation speed Nm1tag to a target rotation speed Nm1* of the motor MG1 and sets a required voltage VHtag to a target voltage VH* of the high voltage-side power lines 54a, such that the voltage VH of the high voltage-side power lines 54a becomes lower than a reverse voltage Vcef1 generated in connection with rotation of the motor MG1. The reverse voltage Vcef1 of the motor MG1 corresponds to the product of the angular velocity ωm1 of the motor MG1 and a reverse voltage constant Km1. The required rotation speed Nm1tag and the required voltage VHtag are determined in advance by experiment or by analysis. The required rotation speed Nm1tag may be, for example, 4000 rpm, 5000 rpm, or 6000 rpm. The required voltage VHtag may be, for example, 330 V, 350 V or 370 V.

The HVECU 70 subsequently calculates a target rotation speed Ne* of the engine 22 according to Expression (1) using the target rotation speed Nm1* of the motor MG1, the rotation speed Nm2 of the motor MG2 (i.e., a rotation speed Nd of the driveshaft 36) and a gear ratio ρ (number of teeth of the sun gear/number of teeth of the ring gear) of the planetary gear 30 and sends the calculated target rotation speed Ne* of the engine 22 to the engine ECU 24, while sending the target voltage VH* of the high voltage-side power lines 54a to the motor ECU 40. The rotation speed Nm2 of the motor MG2 is calculated based on the rotational position θm2 of the rotor of the motor MG2 detected by the rotational position detection sensor 44 and is input from the motor ECU 40 by communication. When receiving the target rotation speed Ne* of the engine 22, the engine ECU 24 performs operation control of the engine 22 (intake air flow control, fuel injection control and ignition control), such that the rotation speed Ne of the engine 22 becomes equal to the target rotation speed Ne*. When receiving the target voltage VH* of the high voltage-side power lines 54a, the motor ECU 40 performs switching control of the transistors T31 and T32 of the step-up/down converter 55, such that the voltage VH of the high voltage-side power lines 54a becomes equal to the target voltage VH*.

Figure 3:
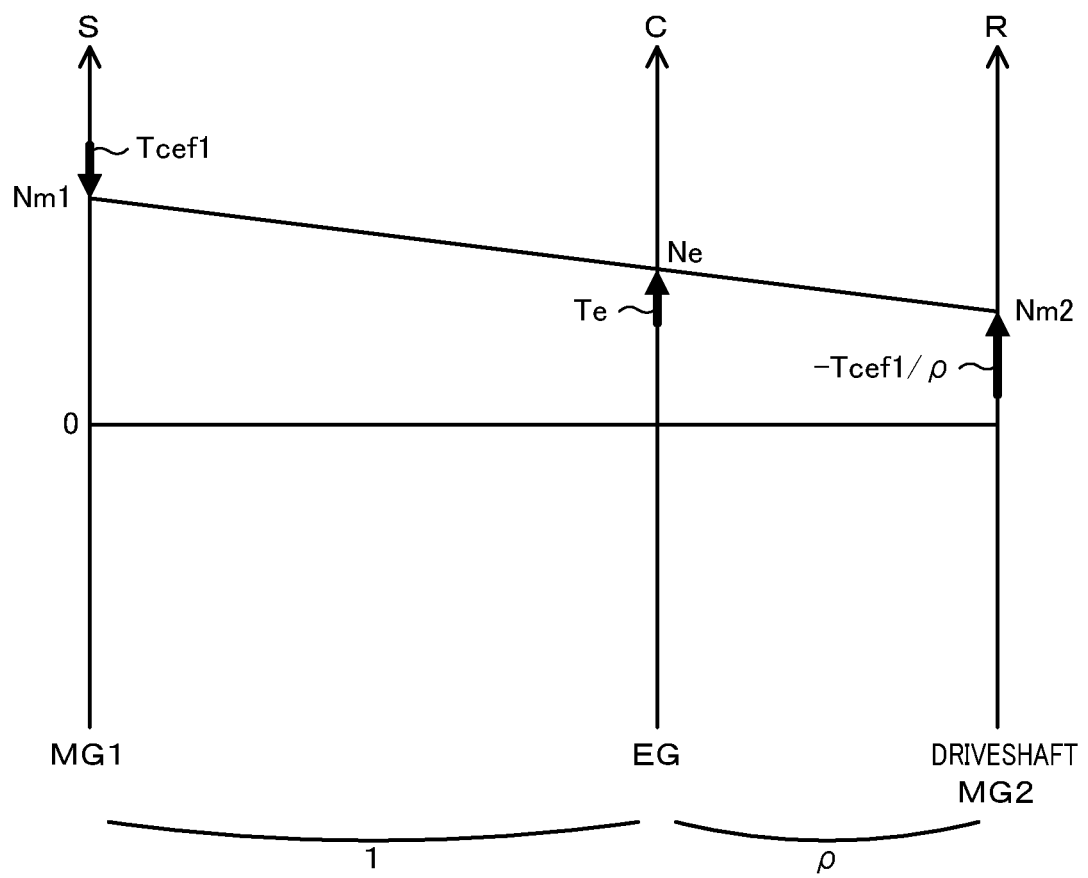
FIG. 3 is a diagram illustrating one example of an alignment chart of a planetary gear 30 when a shift position SP is a forward operating position during an inverter-less operation.

FIG. 3 is a diagram illustrating one example of an alignment chart of a planetary gear 30 when a shift position SP is a forward operating position during an inverter-less operation. In FIG. 3, an S axis on the left side shows the rotation speed of the sun gear of the planetary gear 30 that is equal to the rotation speed Nm1 of the motor MG1. A C axis shows the rotation speed of the carrier of the planetary gear 30 that is equal to the rotation speed Ne of the engine 22. An R axis shows the rotation speed of the ring gear of the planetary gear 30 that is equal to the rotation speed Nm2 of the motor MG2 (and equal to the rotation speed Nd of the driveshaft 36). Expression (1) given above can readily be derived from FIG. 3.

At the shift position SP set to the forward operating position during the inverter-less operation, the lower voltage VH of the high voltage-side power lines 54a than the reverse voltage Vcef1 of the motor MG1 causes a regenerative torque (reverse torque) Tcef1 to be generated by the motor MG1 and causes a reactive torque (−Tcef1/ρ) of this regenerative torque Tcef1 to be output as a drive torque (forward torque) Td to the driveshaft 36 and thereby drive the hybrid vehicle 20. More specifically, the regenerative torque Tcef1 of the motor MG1 is generated when the motor MG1 is rotated by the operation of the engine 22 and an electric current (power) corresponding to a voltage difference (Vcef1-VH) between the reverse voltage Vcef1 of the motor MG1 and the voltage VH of the high voltage-side power lines 54a is supplied to the battery 50 via the step-up/down converter 55 (the transistor T31 and the reactor L). An increase in voltage difference (Vcef1-VH) increases the electric current (power) that is flowed from the motor MG1-side via the step-up/down converter 55 to the battery 50-side, increases the regenerative torque Tcef1 of the motor MG1, and increases the drive torque Td of the driveshaft 36. In the description below, such a run is called "inverter-less run".

Figure 4:
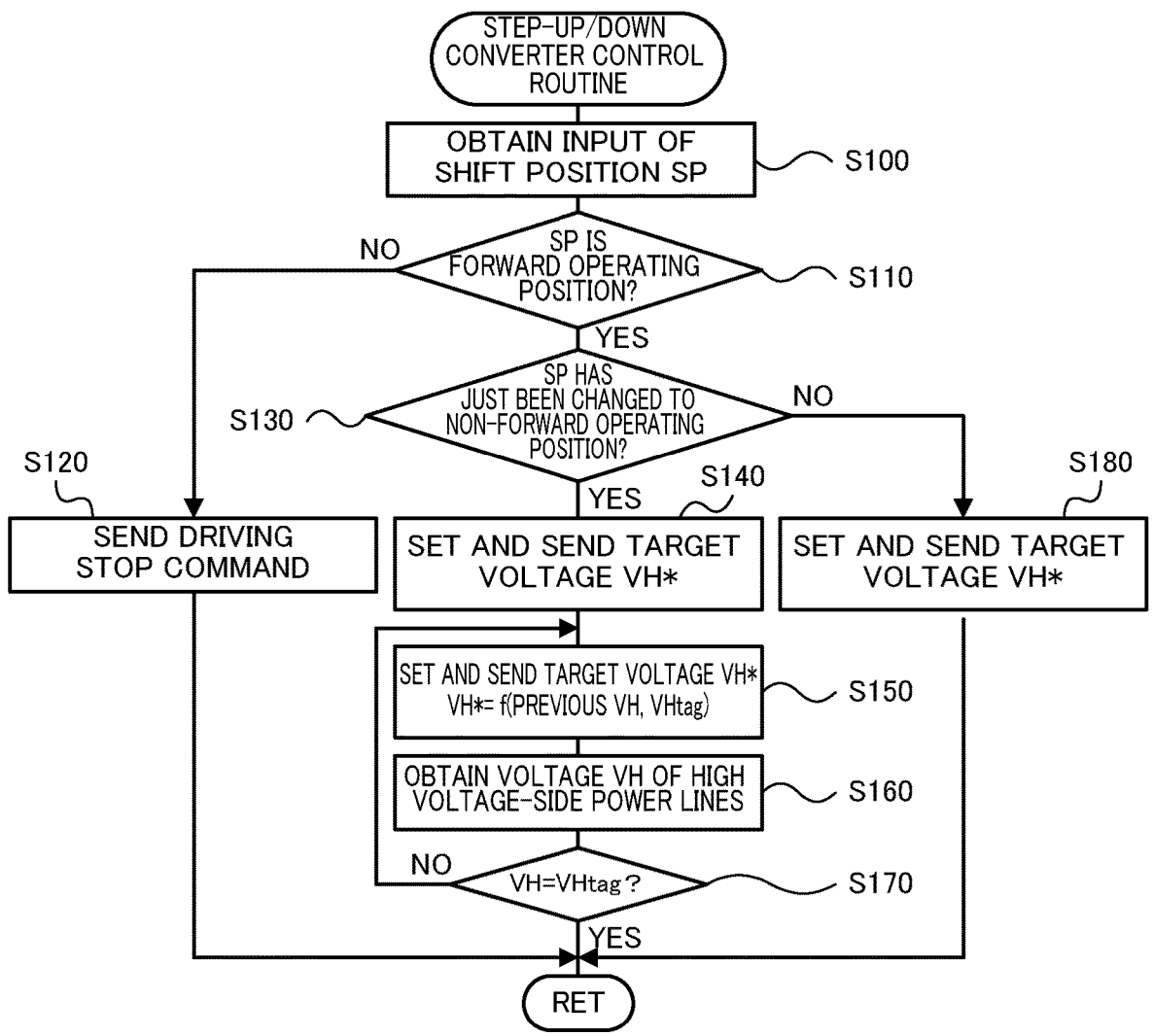
FIG. 4 is a flowchart showing one example of a step-up/down converter control routine performed by an HVECU 70.

The following describes operations of the hybrid vehicle 20 of the embodiment having the above configuration and more specifically a series of control of the step-up/down converter 55 when the shift position SP is a non-forward operating position (P position, R position or N position) or is changed from the non-forward operating position to the forward operating position (D position or B position) during the inverter-less operation. FIG. 4 is a flowchart showing one example of a step-up/down converter control routine performed by the HVECU 70. This routine is performed repeatedly during the inverter-less operation. During the inverter-less operation, the HVECU 70 sets the required rotation speed Nm1tag to the rotation speed Nm1 of the motor MG1, calculates the target rotation speed Ne* of the engine 22 according to Expression (1) given above, and sends the calculated target rotation speed Ne* of the engine 22 to the engine ECU 24, in parallel to this routine. When receiving the target rotation speed Ne* of the engine 22, the engine ECU 24 controls the engine 22, such that the rotation speed Ne of the engine 22 becomes equal to the target rotation speed Ne*.

When the step-up/down converter control routine of FIG. 4 is triggered, the HVECU 70 obtains the input of the shift position SP from the shift position sensor 82 (step S100) and determines whether the input shift position SP is the forward operating position or the non-forward operating position (step S110). When it is determined at step S110 that the input shift position SP is the non-forward operating position, the HVECU 70 sends a driving stop command of the step-up/down converter 55 to the motor ECU 40 (step S120) and terminates this routine. When receiving the driving stop command of the step-up/down converter 55, the motor ECU 40 stops driving the step-up/down converter 55 (turns off the transistors T31 and T32) or maintains the driving stop state.

When the shift position SP is changed from the forward operating position to the non-forward operating position during the inverter-less operation, the step-up/down converter 55 is stopped in the state that the voltage VH of the high voltage-side power lines 54a is lower than the reverse voltage Vcef1 of the motor MG1. This causes electric power based on the reverse voltage Vcef1 of the motor MG1 to be changed into the capacitor 57 and makes the reverse voltage Vcef1 of the motor MG1 equal to the voltage VH of the high voltage-side power lines 54a. The step-up/down converter 55 is stopped at the shift position SP set to the P position or the N position, since such setting suggests that the driver has no intention to drive. The step-up/down converter 55 is stopped at the shift position set to the R position, since reverse driving is not allowed during the inverter-less operation.

When it is determined at step S110 that the shift position SP is the forward operating position, the HVECU 70 subsequently determines whether the shift position SP has just been changed from the non-forward operating position to the forward operating position (step S130). When it is determined that the shift position SP has just been changed from the non-forward operating position to the forward operation position, the HVECU 70 sets a maximum allowable voltage VHmax to the target voltage VH* of the high voltage-side power lines 54a and sends the set target voltage VH* to the motor ECU 40 (step S140). When receiving the target voltage VH* of the high voltage-side power lines 54a, the motor ECU 40 controls the step-up/down converter 55 such that the voltage VH of the high voltage-side power lines 54a becomes equal to the target voltage VH*.

The HVECU 70 subsequently sets the target voltage VH* of the high voltage-side power lines 54a, such that the voltage VH of the high voltage-side power lines 54a gradually changes from the maximum allowable voltage VHmax to the required voltage VHtag and sends the set target voltage VH* to the motor ECU 40 (step S150). When receiving the target voltage VH* of the high voltage-side power lines 54a, the motor ECU 40 controls the step-up/down converter 55 such that the voltage VH of the high voltage-side power lines 54a becomes equal to the target voltage VH*.

The HVECU 70 subsequently obtains the input of the voltage VH of the high voltage-side power lines 54a (step S160) and determines whether the the voltage VH of the high voltage-side power lines 54a is equal to the required voltage VHtag (step S170). When the voltage VH of the high voltage-side power lines 54a is higher than the required voltage VHtag, the HVECU 70 returns to step S150.

The processing of steps S150 to S170 is repeatedly performed to gradually change (smoothly change) the target voltage VH* (voltage VH) of the high voltage-side power lines 54a from the maximum allowable voltage VHmax to the required voltage VHtag. The control procedure of the embodiment takes into account the response of the engine 22 and gradually changes the target voltage VH* (voltage VH) of the high voltage-side power lines 54a, such that the rotation speed Nm1 of the motor MG1 is kept in a range of not lower than a rotation speed (Nm1tag−ΔNm1) that is lower than the required rotation speed Nm1tag by a predetermined rotation speed ΔNm1. More specifically, the control procedure of the embodiment determines in advance a relationship of the target voltage VH* of the high voltage-side power lines 54a to a time elapsed since a change of the shift position SP by experiment or by analysis and stores the predetermined relationship as a gradual voltage change map in the ROM (not shown). The control procedure of the embodiment then applies a time elapsed since a change of the shift position SP to this gradual voltage change map, so as to set the target voltage VH* of the high voltae-side power lines 54a and control the step-up/down converter 55 to gradually change the voltage VH of the high voltage-side power lines 54a. The predetermined rotation speed ΔNm1 may be, for example, about several ten rpm to several hundred rpm.

When the voltage VH of the high voltage-side power lines 54a reaches the required voltage VHtag by repetition of the processing of steps S150 to S170, the HVECU 70 terminates this routine. In a subsequent or later cycle of this routine, when it is determined at step S110 that the shift position SP is the forward operating position and it is subsequently determined at step S130 that the shift position SP has not just been changed from the non-forward operating position to the forward operating position, the HVECU 70 sets the required voltage VHtag to the target voltage VH* of the high voltage-side power lines 54a (step S180) and then terminates this routine. When receiving the target voltage VH* of the high voltage-side power lines 54a, the motor ECU 40 controls the step-up/down converter 55 such that the voltage VH of the high voltage-side power lines 54a becomes equal to the target voltage VH*.

As described above, when the shift position SP is changed from the non-forward operating position to the forward operating position, the control procedure of the embodiment gradually changes (smoothly changes) the voltage VH of the high voltage-side power lines 54a toward the required voltage VHtag. This configuration suppresses a sharp increase in voltage difference (Vcef1−VH) between the reverse voltage Vcef1 of the motor MG1 and the voltage VH of the high voltage-side power lines 54a and suppresses a sharp increase in regenerative torque Tcef1 of the motor MG1 and thereby a sharp increase in drive torque Td of the driveshaft 36. Suppressing the sharp increase in regenerative torque Tcef1 of the motor MG1 results in suppressing a reduction of the rotation speed Nm1 of the motor MG1 relative to the required rotation speed Nm1tag and thereby a decrease in voltage difference (Vcef1−VH) due to the lower response of the engine 22 (more specifically, the lower change response of the torque of the engine 22) than the response of the step-up/down converter 55 (more specifically, the change response of the voltage VH of the high voltage-side power lines 54a), and results in suppressing a decrease in regenerative torque Tcef1 of the motor MG1 and thereby a decrease in drive torque Td of the driveshaft 36. As a result, such control suppresses the drive torque Td of the driveshaft 36 from becoming unstable. Furthermore, the control procedure of the embodiment takes into account the response of the engine 22 and gradually changes the target voltage VH* (voltage VH) of the high voltage-side power lines 54a. This more appropriately suppresses the drive torque Td of the driveshaft 36 from becoming unstable. Additionally, the control procedure of the embodiment gradually changes the target voltage VH* (voltage VH) of the high voltage-side power lines 54a, such that the rotation speed Nm1 of the motor MG1 is kept in the range of not lower than the rotation speed (Nm1tag−ΔNm1). This more effectively suppresses a decrease in rotation speed Nm1 of the motor MG1 and thereby a decrease in voltage difference (Vcef1−VH), and more effectively suppresses a decrease in regenerative torque Tcef1 of the motor MG1 and thereby a decrease in drive torque Td of the driveshaft 36. Furthermore, the control procedure of the embodiment applies the time elapsed since the change of the shift position SP to the predetermined relationship of the target voltage VH* of the high voltage-side power lines 54a to the time elapsed since the change of the shift position SP (gradual voltage change map), so as to gradually change the target voltage VH* of the high voltage-side power lines 54a. This configuration reduces the processing load of the HVECU 70, compared with a configuration that gradually changes the target voltage VH* of the high voltage-side power lines 54a based on the rotation speed Nm1 of the motor MG1 or the like.

When the shift position SP is changed from the non-forward operating position to the forward operating position, the control procedure of the embodiment increases the target voltage VH* (voltage VH) of the high voltage-side power lines 54a to the maximum allowable voltage VHmax and then gradually changes the target voltage VH* (voltage VH) toward the required voltage VHtag. This configuration provides a time lag from the time of the change of the shift position SP to the time when the voltage VH of the high voltage-side power lines 54a becomes lower than the reverse voltage Vcef1 of the motor MG1 to generate the regenerative torque Tcef1 of the motor MG1 and thereby the drive torque Td of the driveshaft 36, and accordingly suppresses the driver from feeling like jumping out.

Figure 5:
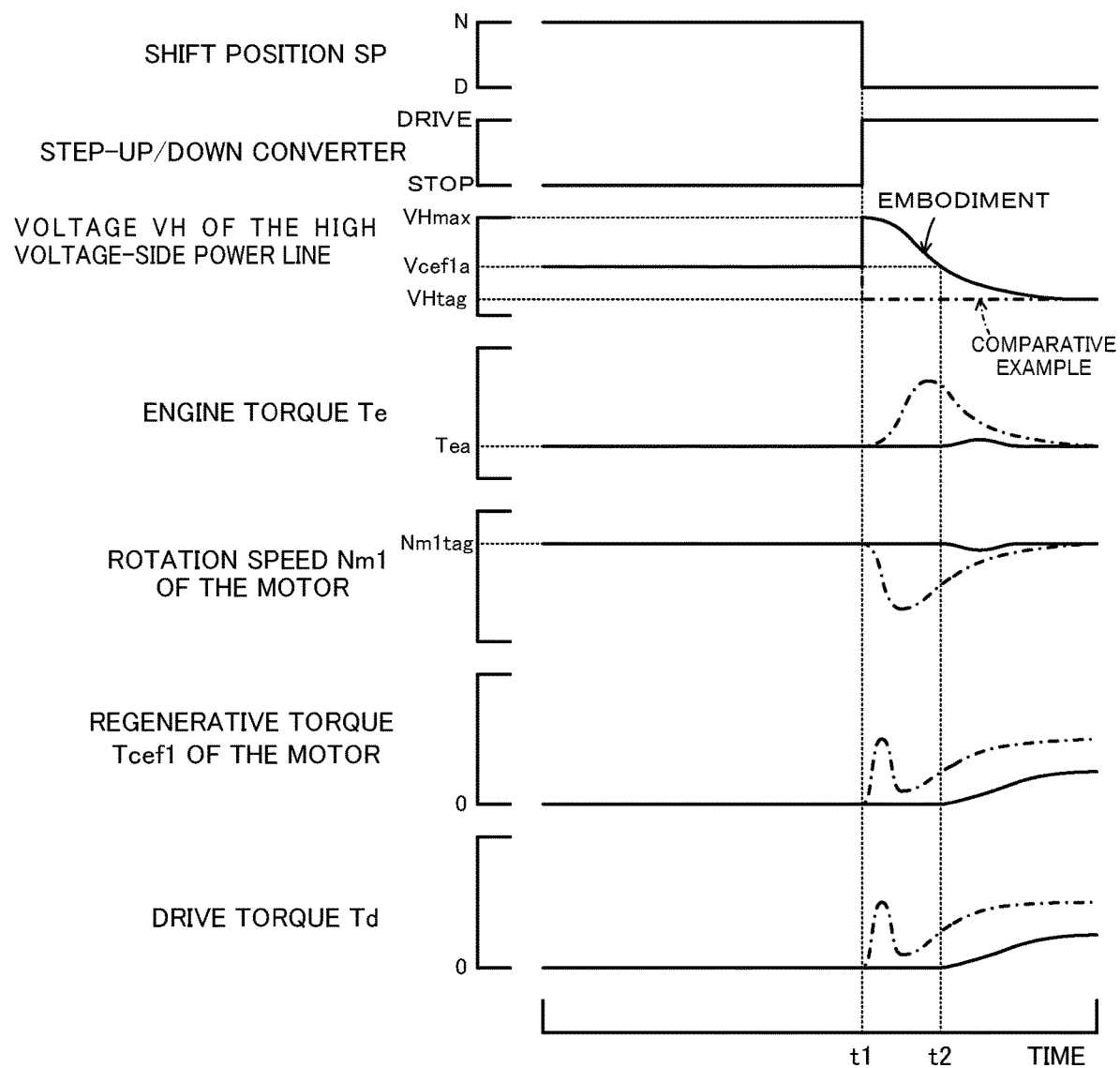
FIG. 5 is a diagram illustrating one example of variations when the shift position SP is changed from a non-forward operating position to the forward operating position during the inverter-less operation.

FIG. 5 is a diagram illustrating one example of variations when the shift position SP is changed from the non-forward operating position to the forward operating position during the inverter-less operation. FIG. 5 illustrates variations in the shift position SP, the state of the step-up/down converter 55, the voltage VH of the high voltage-side power lines 54a, the torque Te of the engine 22, the rotation speed Nm1 of the motor MG1, the regenerative torque Tcef1 of the motor MG1, and the drive torque Td of the driveshaft 36. In this diagram, "Vcef1a" denotes the reverse voltage Vcef1 of the motor MG1 when the motor MG1 is rotated at the required rotation speed Nm1tag, and "Tea" denotes the torque Te of the engine 22 when the motor MG1 is rotated at the required rotation speed Nm1tag. In this diagram, solid line curves show an embodiment and one-dot chain line curves show a comparative example, with regard to the voltage VH of the high voltage-side power lines 54a, the torque Te of the engine 22, the rotation speed Nm1 of the motor MG1, the regenerative torque Tcef1 of the motor MG1 and the drive torque Td of the driveshaft 36. When the shift position SP is changed from the non-forward operating position to the forward operating position, a control procedure of the comparative example abruptly decreases the voltage VH of the high voltage-side power lines 54a to the required voltage VHtag.

When the shift position SP is changed from the non-forward operating position to the forward operating position (time t1), the control procedure of the comparative example abruptly decreases the voltage VH of the high voltage-side power lines 54a to the required voltage VHtag. This results in sharply increasing the voltage difference (Vcef1−VH) between the reverse voltage Vcef1 of the motor MG1 and the voltage VH of the high voltage-side power lines 54a and sharply increasing the regenerative torque Tcef1 of the motor MG1 and thereby the drive torque Td of the driveshaft 36. The sharp increase of the regenerative torque Tcef1 of the motor MG1 decreases the rotation speed Nm1 of the motor MG1 relative to the required rotation speed Nm1tag, decreases the voltage difference (Vcef1−VH), and decreases the regenerative torque Tcef1 of the motor MG1 and thereby the drive torque Td of the driveshaft 36. A subsequent increase in the torque Te of the engine 22 relative to the torque Tea results in increasing the rotation speed Nm1 of the motor MG1 toward the required rotation speed Nm1tag, increasing the voltage difference (Vcef1−VH), and accordingly increasing the regenerative torque Tcef1 of the motor MG1 and thereby the drive torque Td of the driveshaft 36. This phenomenon causes the drive torque Td of the driveshaft 36 to become unstable.

When the shift position SP is changed from the non-forward operating position to the forward operating position (time t1), the control procedure of the embodiment, on the other hand, abruptly increases the voltage VH of the high voltage-side power lines 54a to the maximum allowable voltage VHmax and then gradually changes (smoothly changes) the voltage VH toward the required voltage VHtag. This does not generate the regenerative torque Tcef1 of the motor MG1 and thereby does not generate the drive torque Td of the driveshaft 36 until the voltage VH of the high voltage-side power lines 54a becomes lower than the voltage Vcef1a (time t1 to time t2). When the voltage VH of the high voltage-side power lines 54a becomes lower than the voltage Vcef1a (time t2), this generates the regenerative torque Tcef1 of the motor MG1 and thereby generates the drive torque Td of the driveshaft 36. The gradual change in the voltage VH of the high voltage-side power lines 54a, however, causes a gradual increase in the voltage difference (Vcef1−VH) and results in gradually increasing the regenerative torque Tcef1 of the motor MG1 and thereby gradually increasing the drive torque Td of the driveshaft 36. The gradual increase in the regenerative torque Tcef1 of the motor MG1 suppresses a reduction in the rotation speed Nm1 of the motor MG1 relative to the required rotation speed Nm1tag and also suppresses an increase in the torque Te of the engine 22 relative to the torque Tea. Suppressing the decrease in the rotation speed Nm1 of the motor MG1 and thereby the decrease in the voltage difference (Vcef1−VH) results in suppressing a decrease in the regenerative torque Tcef1 of the motor MG1 and thereby a decrease in the drive torque Td of the driveshaft 36. The control procedure of the embodiment then gradually increases the regenerative torque Tcef1 of the motor MG1 and thereby the drive torque Td of the driveshaft 36 until the voltage VH of the high voltage-side power lines 54a reaches the required voltage VHtag. As a result, such control suppresses the drive torque Td of the driveshaft 36 from becoming unstable.

As described above, when the shift position SP is changed from the non-forward operating position to the forward operating position during the inverter-less operation, the hybrid vehicle 20 of the embodiment starts driving the step-up/down converter 55 and controls the step-up/down converter 55, such as to gradually change the voltage VH of the high voltage-side power lines 54a toward the required voltage VHtag. This configuration suppresses the drive torque Td of the driveshaft 36 from becoming unstable, compared with the configuration that controls the step-up/down converter 55 to abruptly change the voltage VH of the high voltage-side power lines 54a toward the required voltage VHtag.

Additionally, when the shift position SP is changed from the non-forward operating position to the forward operating position during the inverter-less operation, the hybrid vehicle 20 of the embodiment controls the step-up/down converter 55, such that the voltage VH of the high voltage-side power lines 54a increases to the maximum allowable voltage VHmax and then gradually changes toward the required voltage VHtag. This provides a time lag from the time of the change of the shift position SP to the time of generation of the regenerative torque Tcef1 of the motor MG1 and thereby generation of the drive torque Td of the driveshaft 36, and accordingly suppresses the driver from feeling like jumping out.

When the shift position SP is changed from the non-forward operating position to the forward operating position during the inverter-less operation, the hybrid vehicle 20 of the embodiment once increases the target voltage VH* (voltage VH) of the high voltage-side power lines 54a to the maximum allowable voltage VHmax and then gradually changes the target voltage VH* (voltage VH) toward the required voltage VHtag. This configuration is, however, not restrictive. A modification may once increase the target voltage (VH*) (voltage VH) of the high voltage-side power lines 54a to a voltage VHset that is higher than the reverse voltage Vcef1 of the motor MG1 but is lower than the maximum allowable voltage VHmax and then gradually change the target voltage VH* (voltage VH) toward the required voltage VHtag. Another modification may change the target voltage VH* (voltage VH) of the high voltage-side power lines 54a toward the required voltage VHtag without once increasing the target voltage VH* (voltage VH).

When the shift position SP is changed from the non-forward operating position to the forward operating position during the inverter-less operation, the hybrid vehicle 20 of the embodiment applies the time elapsed since the change of the shift position SP to the predetermined relationship of the target voltage VH* of the high voltage-side power lines 54a to the time elapsed since the change of the shift position SP (gradual voltage change map), so as to gradually change the target voltage VH* (voltage VH) of the high voltage-side power lines 54a. A modification may gradually change the target voltage VH* of the high voltage-side power lines 54a by a rating process using a rate value. Another modification may gradually change the target voltage VH* of the high voltage-side power lines 54a by an averaging process using a time constant. In these modifications, the rate value or the time constant used may be a preset uniform value or may be a variable varying according to the rotation speed Nm1 of the motor MG1 or the like. It is preferable to set the rate value or the time constant such as to keep the rotation speed Nm1 of the motor MG1 in the range of not lower than the rotation speed (Nm1tag−ΔNm1), by taking into account the response of the engine 22.

When the shift position SP is changed from the non-forward operating position to the forward operating position during the inverter-less operation, the hybrid vehicle 20 of the embodiment takes into account the response of the engine 22 and gradually changes the target voltage VH* (voltage VH) of the high voltage-side power lines 54a toward the required voltage VHtag, such that the rotation speed Nm1 of the motor MG1 is kept in the range of not lower than the rotation speed (Nm1tag−ΔNm1). A modification may gradually change the target voltage VH* of the high voltage-side power lines 54a toward the required voltage VHtag without taking into account the response of the engine 22. This modification also serves to suppress the drive torque Td of the driveshaft 36 from becoming unstable to some extent, compared with the configuration that abruptly changes the target voltage VH* of the high voltage-side power lines 54a toward the required voltage VHtag.

The hybrid vehicle 20 of the embodiment uses the battery 50 as the power storage device. The power storage device used may, however, be any device that is capable of accumulating electricity, such as a capacitor.

The hybrid vehicle 20 of the embodiment is provided with the engine ECU 24, the motor ECU 40, the battery ECU 52 and the HVECU 70. According to a modification, at least two of them may be configured as one single electronic control unit.

In the hybrid vehicle of the above aspect, when the shift position is changed from the non-forward operating position to the forward operating position during the predetermined operation, the control device may control the step-up/down converter to gradually change the voltage of the high voltage-side power line toward the required voltage according to a response of the engine. This configuration enables the voltage of the high voltage-side power line to gradually change according to the response of the engine.

In the hybrid vehicle of the above aspect, when the shift position is changed from the non-forward operating position to the forward operating position during the predetermined operation, the control device may control the step-up/down converter to gradually change the voltage of the high voltage-side power line toward the required voltage, such that a rotation speed of the first motor is kept in a range of not lower than a predetermined rotation speed. This configuration more effectively suppresses a reduction in the rotation speed of the first motor and more effectively suppresses a decrease in the regenerative torque of the first motor and thereby a decrease in the drive torque of the driveshaft.

In the hybrid vehicle of the above aspect, when the shift position is changed from the non-forward operating position to the forward operating position during the predetermined operation, the control device may apply a time elapsed since the change of the shift position to a predetermined relationship of a target voltage of the high voltage-side power line to the time elapsed to set the target voltage and may control the step-up/down converter by using the target voltage. This configuration reduces the processing load, compared with a configuration that gradually changes the target voltage of the high voltage-side power line by calculation based on, for example, the rotation speed of the first motor.

In the hybrid vehicle of the above aspect, when the shift position is changed from the non-forward operating position to the forward operating position during the predetermined operation, the control device may control the step-up/down converter such that the voltage of the high voltage-side power line first increases to a predetermined voltage that is higher than the reverse voltage of the first motor and then decreases to the required voltage. This configuration provides a time lag from the time of the change of the shift position to the time of generation of a regenerative torque of the first motor and thereby generation of a drive torque of the driveshaft and suppresses the driver from feeling like jumping out. In this aspect, the predetermined voltage may be a maximum allowable voltage of the high voltage-side power line.

The following describes the correspondence relationship between the primary elements of the above embodiment and the primary elements of the disclosure described in Summary. The engine 22 of the embodiment corresponds to the "engine", the motor MG1 corresponds to the "first motor", the planetary gear 30 corresponds to the "planetary gear", the motor MG2 corresponds to the "second motor", the inverter 41 corresponds to the "first inverter", the inverter 42 corresponds to the "second inverter", the battery 50 corresponds the "power storage device", the boost converter 55 corresponds to the "boost converter", and the HVECU 70, the engine ECU 24, the motor ECU 40 and the battery ECU 52 correspond to the "control device".

The correspondence relationship between the primary components of the embodiment and the primary components of the present disclosure, regarding which the problem is described in Summary, should not be considered to limit the components of the present disclosure, regarding which the problem is described in Summary, since the embodiment is only illustrative to specifically describes the aspects of the present disclosure, regarding which the problem is described in Summary. In other words, the present disclosure, regarding which the problem is described in Summary, should be interpreted on the basis of the description in Summary, and the embodiment is only a specific example of the present disclosure, regarding which the problem is described in Summary.

The aspect of the present disclosure is described above with reference to the embodiment. The present disclosure is, however, not limited to the above embodiment but various modifications and variations may be made to the embodiment without departing from the scope of the present disclosure.

INDUSTRIAL APPLICABILITY

The disclosure is applicable to, for example, the manufacturing industries of hybrid vehicles.

The invention claimed is:

1. A hybrid vehicle, comprising:
an engine;
a first motor configured to generate a reverse voltage by rotation;
a planetary gear configured to include three rotational elements respectively connected with three axes of the first motor, the engine, and a driveshaft coupled with drive wheels, such that the first motor, the engine and the driveshaft are aligned in this sequence in an alignment chart;
a second motor configured to input and output power into and from the driveshaft;
a first inverter configured to drive the first motor;
a second inverter configured to drive the second motor;
a power storage device;
a step-up/down converter connected with a low voltage-side power line, which the power storage device is connected with, and with a high voltage-side power line, which the first inverter and the second inverter are connected with, and configured to transmit electric power between the low voltage-side power line and the high voltage-side power line with regulation of a voltage of the high voltage-side power line; and
a control device configured to control the step-up/down converter such that the voltage of the high voltage-side power line is lower than a reverse voltage of the first motor when a shift position is a forward operating position, and to stop driving the step-up/down converter when the shift position is a non-forward operating position, during a predetermined operation that shuts off gates of the first inverter and the second inverter and operates the engine, wherein
when the shift position is changed from the non-forward operating position to the forward operating position during the predetermined operation, the control device controls the step-up/down converter to gradually change the voltage of the high voltage-side power line toward a required voltage that is lower than the reverse voltage of the first motor.

2. The hybrid vehicle according to claim 1,
wherein when the shift position is changed from the non-forward operating position to the forward operating position during the predetermined operation, the control device controls the step-up/down converter to gradually change the voltage of the high voltage-side power line toward the required voltage according to a response of the engine.

3. The hybrid vehicle according to claim 1,
wherein when the shift position is changed from the non-forward operating position to the forward operating position during the predetermined operation, the control device controls the step-up/down converter to gradually change the voltage of the high voltage-side power line toward the required voltage, such that a rotation speed of the first motor is kept in a range of not lower than a predetermined rotation speed.

4. The hybrid vehicle according to claim 1,
wherein when the shift position is changed from the non-forward operating position to the forward operating position during the predetermined operation, the control device applies a time elapsed since the change of the shift position to a predetermined relationship of a target voltage of the high voltage-side power line to the time elapsed to set the target voltage and controls the step-up/down converter by using the target voltage.

5. The hybrid vehicle according to claim 1,
wherein when the shift position is changed from the non-forward operating position to the forward operating position during the predetermined operation, the control device controls the step-up/down converter such that the voltage of the high voltage-side power line first increases to a predetermined voltage that is higher than the reverse voltage of the first motor and then decreases to the required voltage.

6. The hybrid vehicle according to claim 5,
wherein the predetermined voltage is a maximum allowable voltage of the high voltage-side power line.

* * * * *